(12) United States Patent
Barry et al.

(10) Patent No.: US 10,284,128 B2
(45) Date of Patent: May 7, 2019

(54) CONTROLLER FOR INCREASING TORQUE OUTPUT OF ELECTRIC MOTORS

(71) Applicant: REGAL BELOIT AMERICA, INC., Beloit, WI (US)

(72) Inventors: Andrew Craig Barry, Fort Wayne, IN (US); Brian Lee Beifus, Fort Wayne, IN (US); Lester Benjamin Manz, Paulding, OH (US); Kamron Mark Wright, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/628,347

(22) Filed: Jun. 20, 2017

(65) Prior Publication Data

US 2018/0367075 A1    Dec. 20, 2018

(51) Int. Cl.
*H02P 27/04* (2016.01)
*H02P 21/06* (2016.01)
*H02P 21/20* (2016.01)
*H02P 1/40* (2006.01)

(52) U.S. Cl.
CPC ............... *H02P 21/06* (2013.01); *H02P 1/40* (2013.01); *H02P 21/20* (2016.02); *H02P 27/04* (2013.01)

(58) Field of Classification Search
CPC ........................................ H02P 21/06
USPC .................................................... 318/802
See application file for complete search history.

(56) References Cited

U.S. PATENT DOCUMENTS

| | | | |
|---|---|---|---|
| 7,197,390 B2 * | 3/2007 | Yuan | B60L 15/2045 318/437 |
| 7,755,310 B2 | 7/2010 | West et al. | |
| 8,525,461 B2 | 9/2013 | Marushita et al. | |
| 9,465,370 B2 | 10/2016 | Alexander et al. | |
| 2009/0151801 A1 | 6/2009 | Gorman et al. | |
| 2014/0244051 A1 | 8/2014 | Rollins et al. | |

* cited by examiner

*Primary Examiner* — Erick Glass
(74) *Attorney, Agent, or Firm* — Armstrong Teasdale LLP (57) ABSTRACT

A motor includes a stator comprising windings configured to be energized, and a rotor electromagnetically coupled to the stator and configured to turn relative thereto when the stator is energized. The motor also includes a motor controller configured to measure a speed at which the rotor turns, and energize said stator to generate a first torque output at the rotor when the measured speed is below a first threshold. The motor controller is also configured to energize the stator to generate a second torque output at the rotor when the measured speed is at least the first threshold, wherein the second torque output is greater than the first torque output.

20 Claims, 9 Drawing Sheets

CONTROLLER FOR INCREASING TORQUE OUTPUT OF ELECTRIC MOTORS

BACKGROUND

The field of the disclosure relates generally to a controller for an electric motor and, more specifically, a controller that enables an increased torque output of an electric motor.

At least some known motor controllers are programmed to operate under a defined speed-torque relationship between the motor and a fluid mover (e.g., a blower, pump, or compressor). The motor controller controls delivery of current to the motor that defines a torque output of the motor, wherein the torque output is generally proportional to the current input. Different torque output profiles are available, to provide different levels of fluid flow under different settings (e.g., for air flow, heating, cooling, or fan settings). Generally, a higher torque output corresponds to an increased fluid flow. In some cases, the motor controller controls the motor to operate under constant-torque conditions, such that the motor is generally known as a "constant-torque motor." In these cases, the torque output is controlled according to a speed-torque profile, under which torque is increased in a stepwise manner independent of speed. Specifically, the motor controller is configured to calibrate the motor using a plurality of calibration points (i.e., speed-torque measurements) to map the speed-torque relationship.

In other cases, the motor controller controls the motor to operate under constant fluid flow conditions, such that the motor is generally known as a "constant fluid flow motor." In these cases, the torque output is controlled according to a speed-torque-fluid flow profile, such that adjusting a torque output of the motor facilitates control of the fluid flow output from the fluid mover in a predictable manner. Specifically, the motor controller is configured to calibrate the motor using a plurality of calibration points (i.e., speed-torque-fluid flow measurements) to map the speed-torque-fluid flow relationship.

For both constant-torque and constant fluid flow motors, a given profile is available from one tap of a plurality of taps. Put another way, each tap provides an output according to a particular pre-programmed profile (i.e., speed-torque profile, or speed-torque-fluid flow profile). For example, one tap corresponds to a "low-torque" motor setting, another tap corresponds to a "medium-low torque" motor setting, a third tap corresponds to a "medium-torque" motor setting, etc. A higher-torque tap may be selected (e.g., by an installer) for an increased fluid flow. For example, in a heating, ventilation, and air conditioning (HVAC) system incorporating such a motor to drive a blower, different airflow may be selected for different situations, such as cooling, heating, or circulating air. However, the fluid flow output from a given motor operating under a given torque output profile can vary according to the construction of the fluid mover, ductwork or piping through which the fluid flows, or other flow restriction. When the fluid flow restriction, or static pressure, is particularly high, higher torque output profiles may be selected to compensate therefor. Operating with a higher torque output profile requires more power, which can negatively impact an efficiency rating of the electric motor, even if the relative inefficiency is a result of compensation for environmental factors.

BRIEF DESCRIPTION

In one aspect, a motor is provided. The motor includes a stator including windings configured to be energized, a rotor electromagnetically coupled to the stator and configured to turn relative thereto when the stator is energized, and a motor controller. The motor controller is configured to measure a speed at which the rotor turns, and energize the stator to generate a first torque output at the rotor when the measured speed is below a first threshold. The motor controller is also configured to energize the stator to generate a second torque output at the rotor when the measured speed is at least the first threshold, wherein the second torque output is greater than the first torque output.

In another aspect, a fluid moving system is provided. The fluid moving system includes a fluid mover configured to generate a fluid flow, and a motor coupled to the fluid mover and configured to drive the fluid mover. The motor includes a stator including windings configured to be energized, a rotor electromagnetically coupled to the stator and configured to turn relative thereto when the stator is energized, and a controller. The controller is configured to measure a speed at which the rotor turns, and energize the stator to generate a first torque output at the rotor when the measured speed is below a first threshold. The controller is also configured to energize the stator to generate a second torque output at the rotor when the measured speed is at least the first threshold, wherein the second torque output is greater than the first torque output.

In yet another aspect, a method for increasing a torque output of a motor is provided. The method includes measuring a speed of the motor, and energizing the motor to generate a first torque output when the measured speed is below a first threshold. The method also includes energizing the motor to generate a second torque output when the measured speed is at least the first threshold, wherein the second torque output is greater than the first torque output.

DETAILED DESCRIPTION

Embodiments of a motor, controller, and methods of operating an electric motor described herein provide improved operation of the electric motor to provide increased torque output with respect to a given torque output profile.

As described herein, a torque output "boost" when the motor reaches a threshold speed is sufficient to overcome static pressure and provide a desired fluid flow. The controllers described herein are configured to measure a speed of the motor (i.e., a speed of a rotor of the motor), operate the motor to generate a first torque output when the measured speed is below a first threshold, and operate the motor to generate a second torque output higher than the first torque output when the measured speed is at least the first threshold. Accordingly, by supplementing a lower speed-torque profile with a boost rather than operating under a higher speed-torque profile, the controllers described herein facilitate more efficient use of motors.

Figure 1:
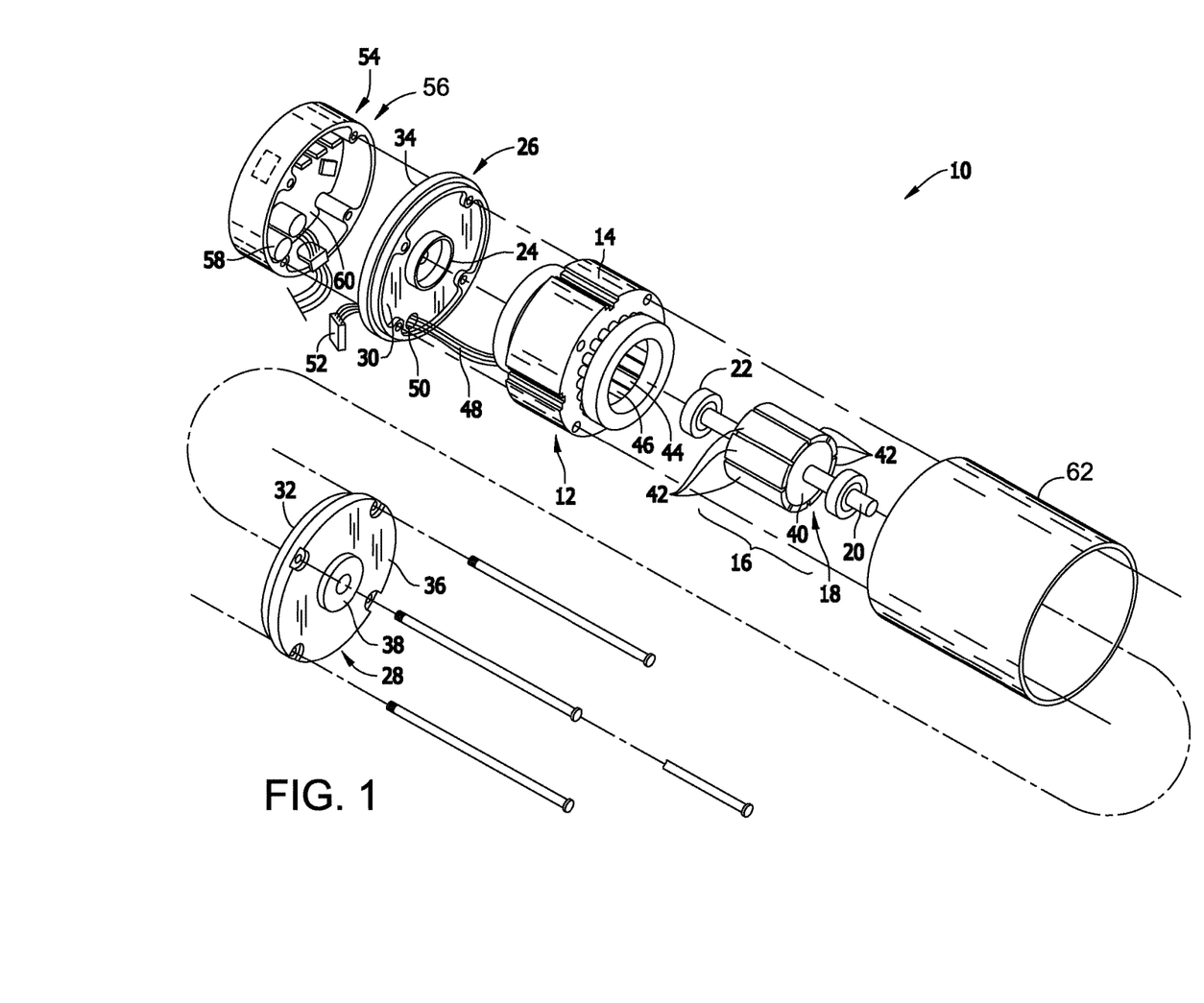
FIG. 1 is an exploded view of an exemplary motor.

FIG. 1 is an exploded view of an exemplary motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and coupled to shaft 20 for rotation within conventional bearings 22. Bearings 22 are mounted in bearing supports 24 integral with a first end member 26 and a second end member 28. First end member 26 has an inner facing side 30, and second end member 28 has an inner facing side 32. In addition, first end member 26 has an outer side 34, and second end member 28 has an outer side 36. Outer sides 34 and 36 are opposite inner sides 30 and 32 respectively. Stationary assembly 12 and rotatable assembly 16 are located between sides 30 and 32. Additionally, second end member 28 includes an aperture 38 for shaft 20 to extend through outer side 34.

Rotor 18 comprises a ferromagnetic core 40 and is rotatable within stator 14. Rotor core 40 includes a plurality of segments 42 of permanent magnet material, each providing a relatively constant flux field. Segments 42 are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number and construction, and flux fields may be utilized with such other rotors within the scope of the invention.

Stationary assembly 12 includes a plurality of windings 44 adapted to be electrically energized to generate an electromagnetic field, and stator core 14 includes a plurality of teeth 46. Windings 44 are coils of wire wound around teeth 46. Windings 44 terminate in winding terminal leads 48, which are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention. Motor 10, in some embodiments, includes any even number of rotor poles and any number of stator poles.

Motor 10 further includes an enclosure 54 which mounts on the rear portion of motor 10. A motor controller 56 includes a plurality of electronic components 58 and a connector (not shown) mounted on a component board 60, such as a printed circuit board. Motor controller 56 is connected to winding stages 44 by interconnecting connector 52. Motor controller 56 applies a current to one or more of winding stages 44 at a time for commutating windings 44 in a preselected sequence to rotate rotatable assembly 16 about an axis of rotation. In other words, motor controller 56 applies a current to winding stages 44 to generate a torque output of rotor 18. The torque output of rotor 18 is generally proportional to the current applied to winding stages 44.

A housing 62 is positioned between first end member 26 and second end member 28 to facilitate enclosing and protecting stationary assembly 12 and rotatable assembly 16.

Figure 2:
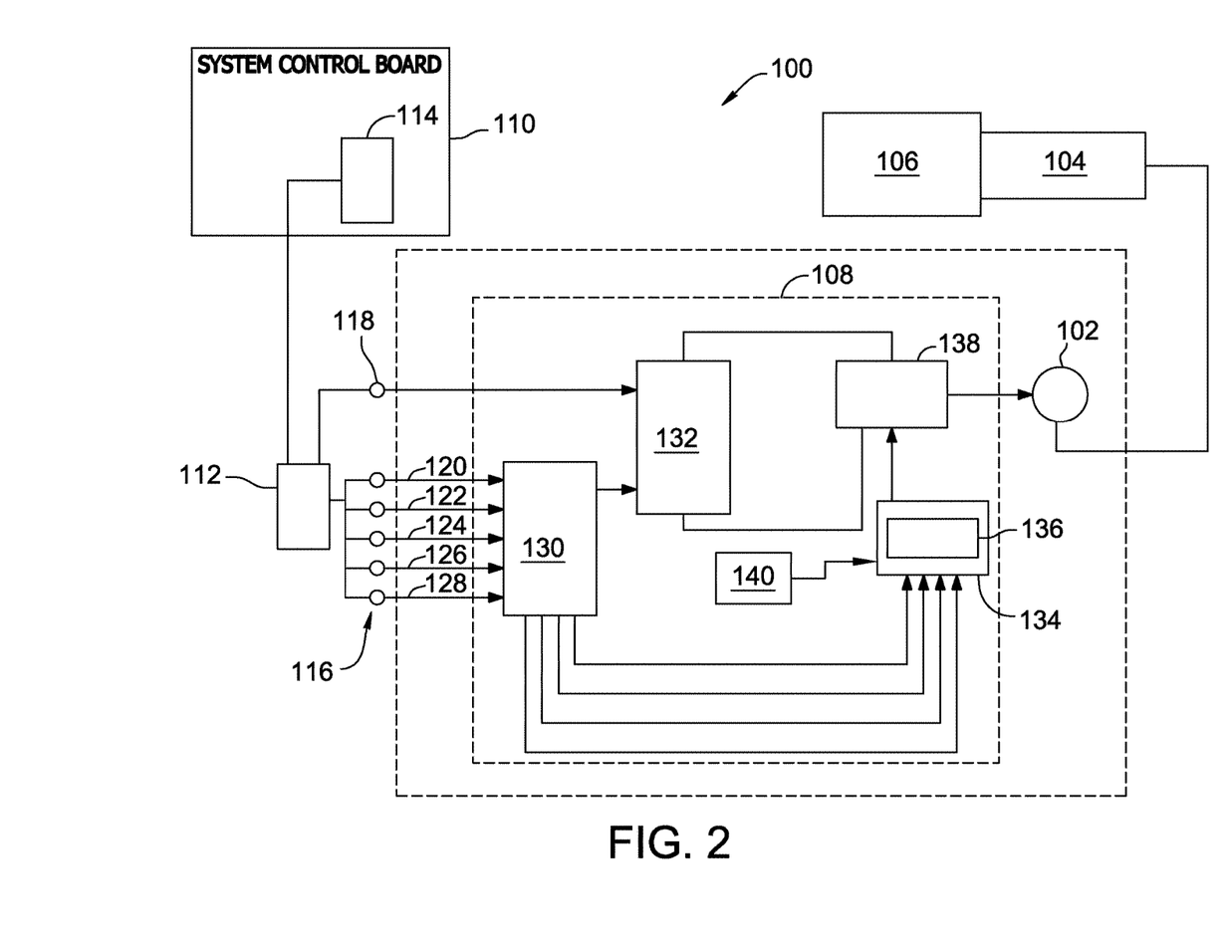
FIG. 2 is a schematic diagram of a motor system for controlling a motor.

FIG. 2 is a schematic diagram of a motor system 100, such as a fluid moving system, for controlling a motor 102, which may be similar to motor 10 (shown in FIG. 1). In the exemplary embodiment, motor 102 is utilized as a motor in a fluid-moving system. Motor system 100 further includes a fluid mover 104 driven by motor 102 and at least one conduit 106. In some instances, motor 102 is utilized as a fan and/or blower motor in a heating, ventilation, and air conditioning (HVAC) system. In such embodiments, fluid mover 104 includes a fan and/or blower, driven by motor 102 to move air through conduit 106, which includes one or more ducts of the HVAC system. In other instances, motor 102 is utilized as a pump and/or impeller motor in a liquid-moving system (e.g., a pool or spa, a refrigeration system, etc.). In such embodiments, fluid mover 104 includes a pump or impeller, driven by motor 102 to move liquid (e.g., water, refrigerant, etc.) through conduit 106, which includes piping of the liquid-moving system. Motor 102 may be implemented in any application, such as, but not limited to, a fluid (e.g., water, air, etc.) moving system, a clean room filtering system, a fan filter unit, a variable air volume system, a refrigeration system, a furnace system, and/or an air conditioning system.

Fluid mover 104 is configured to generate a fluid flow directed through conduit 106. Conduit 106 is configured to guide the fluid flow for circulation and distribution within a building, vehicle, or other structure. Conduit 106 has a fluid flow restriction or static pressure that affects the fluid flow output from fluid mover 104. The static pressure is based on various parameters that may affect fluid flow within system 100, such as, but not limited to, the internal dimensions of conduit 106, open or closed dampers, contaminants (e.g., dust, build-up) within conduit 106, the geometry of conduit 106, and the like.

In the exemplary embodiment, motor system 100 includes a controller 108 coupled between motor 102 and a system control board 110. In some embodiments, controller 108 may be implemented as a motor controller coupled to motor 102, which may be the same as or substantially similar to motor controller 56 (shown in FIG. 1). In other embodiments, controller 108 may be separate and/or remote from motor 102. For instance, controller 108 may be coupled to another component of motor system 100, such as a furnace unit, or to a fluid system controller 112, such as an HVAC controller (e.g., a thermostat) or the like. System control board 110 includes fluid system controller 112 and a power source 114. Power source 114 is configured to transmit AC power/signals such as, but not limited to, high and/or low voltages. Fluid system controller 112 is coupled to power source 114, which is also connected to one or more of input taps 116 and a power terminal 118. In the exemplary embodiment, the plurality of input taps 116 includes a first input tap 120, a second input tap 122, a third input tap 124, a fourth input tap 126, and a fifth input tap 128. Alternatively, the plurality of input taps 116 may include any number of input taps 116 to enable motor 102 to function as described herein. In one embodiment, wherein fluid system controller 112 is embodied as an HVAC system controller, based on user settings (e.g., installation settings) and a temperature measured by, for example, fluid system controller 112, system control board 110 causes one of input taps 116 to energize to command motor 102 to operate under settings associated with that particular input tap 116. For example, based on an installation setting, third tap 124 is energized to provide a medium airflow when fluid system controller 112 measures a temperature below a heating temperature setpoint.

Power source 114 transmits a voltage, for example, between about 100V and about 250V, to the plurality of input taps 116. The plurality of input taps 116 are coupled to a motor wire connector of motor 102 (e.g., via individual wires, via a plug/socket arrangement, or otherwise). Moreover, the plurality of input taps 116 may be coupled to power source 114 in response to control signals from a thermostat (not shown) (e.g., wherein the thermostat opens or closes relays between power source 114 and the plurality of input taps 116).

Motor system 100 further includes controller 108 coupled to the plurality of input taps 116 and power terminal 118. Controller 108 includes a tap detection circuit 130, a rectifier 132, a processor 134 having a memory 136, a switch driver 138, and a sensor system 140. Tap detection circuit 130 is configured to detect which of the plurality of input taps 116 has been activated by system control board 110. Rectifier 132 is coupled to switch driver 138 and is configured to convert an AC power signal of power source 114 to a DC power signal, wherein the DC power signal is supplied to switch driver 138. Switch driver 138 is coupled to motor 102 using a wire harness, as is known in the art. Moreover, processor 134 is coupled to switch driver 138, wherein memory 136 includes operating instructions for operating motor 102. Sensor system 140 includes one or more sensors that are configured to monitor or measure operational parameters of motor 102. Specifically, in the exemplary embodiment, sensor system 140 is configured to measure a rotational speed of a rotor (e.g., rotor 18, shown in FIG. 1) of motor 102. Sensor system 140 may directly or indirectly measure the rotational speed. Sensor system 140 may monitor other data associated with motor 102, such as, but not limited to, current input, torque, power, and the like. In some embodiments, sensor system 140 may further monitor other data associated with other components of motor system 100, such as fluid mover 104. For example, sensor system 140 may monitor a fluid flow output of fluid mover 104. In the illustrated embodiment, sensor system 140 monitors motor 102 from controller 108. In such embodiments, sensor system 140 may be integrated with processor 134. In other embodiments, at least some sensors of sensor system 140 may be installed on motor 102 and transmit sensor data back to controller 108.

In the exemplary embodiment, the operating instructions stored in memory 136 include at least one pre-programmed operating profile corresponding to each input tap 116 of the plurality of input taps 116. As described further with respect to FIGS. 3-7, at least one speed-torque profile is associated with each input tap 116 that defines operation of controller 108 to control motor 102. More specifically, a first, standard speed-torque profile and a second, "boosted" speed-torque profile are available at one or more input taps 116. The second, boosted speed-torque profile includes operating instructions for controller 108 to measure a speed of the rotor (e.g., rotor 18) of motor 102, and energize the rotor to generate an increased or boosted torque output at or above a programmed threshold speed. In some embodiments, the boosted speed-torque profile is only available in connection with one of input taps 116 (e.g., fifth input tap 128, or an input tap 116 associated with a highest torque or fluid flow output). In other embodiments, a boosted speed-torque profile is available in connection with some or all of input taps 116. In some such embodiments, the boosted speed-torque profile may have different threshold speeds on some or all of input taps 116. For instance, a threshold speed at which the boosted torque is activated may be 900 RPM on fourth input tap 126 (corresponding to a "medium high" fluid output setting, in some cases), and a threshold speed at which the boosted torque is activated may be 875 RPM on third input tap 124 (corresponding to a "medium" fluid output setting, in some cases). In other embodiments, the threshold speed may be the same on some or all of input taps 116. In certain embodiments, a boosted speed-torque profile includes operating instructions for controller 108 to energize the motor to generate the increased or boosted torque output as a result of other operating parameters than just a measured speed, such as a calculated or computed power output of a shaft (e.g., shaft 20, shown in FIG. 1) of motor 102. In such embodiments, controller 108 may compare the compute operating parameter (e.g., a computed power output) to a threshold (e.g., a power threshold) and generate the boosted torque output when the computed operating parameter is at least at the threshold.

In some embodiments, such as for a motor 102 embodied as a constant fluid flow motor configured to provide a substantially constant fluid flow output, one or more switches (e.g., dipswitches, not shown) are available for the installer to activate. When the switch is activated, an increased fluid flow mode is activated. The installer may choose to make this increased fluid flow mode available, for example, for systems with high static pressure. The increased fluid flow mode may cause motor 102 to output increased fluid flow to compensate for the static pressure. In these embodiments, activating the dipswitch may make the increased fluid flow mode available only at or above a threshold motor speed. Accordingly, controller 108 may measure a motor speed and energize motor 102 to generate an increased fluid flow output (e.g., by increasing a torque output of motor 102) when the measured speed is above the threshold.

Processor 134 is programmable so that the operating instructions of motor 102 may be changed and/or overridden by a user, such as an installer, based on information presented to the installer by at least one of an operating manual (not shown), a look up table (not shown), and application operation instructions (not shown). Any information can be used to change/override the operating instructions to enable motor 102 to function as described herein. More particularly, the technician may selectively energize at least one input tap of the plurality of input taps 116 to command motor 102 to perform a function to change an operating instruction. For instance, the installer can selectively energize any one of input taps 116 to select either the standard or the boosted speed-torque profile for motor operation at the corresponding input tap(s) 116.

Controller 108 controls motor 102 by transmitting a command signal, corresponding to a speed-torque profile operating instruction, to components of motor 102. Controller 108 energizes motor 102, specifically a stator thereof (e.g., stator 14, shown in FIG. 1), to generate a torque output at motor 102, specifically a rotor thereof. Motor 102 is, in turn, configured to drive fluid mover 104 to generate fluid flow into conduit 106. In the exemplary embodiment, controller 108 operates motor 102 at a plurality of torque output levels, defined by the speed-torque profiles, to increase or decrease a corresponding motor speed. Increasing or decreasing the motor speed of motor 102 causes motor 102 to drive fluid mover 104 to generate corresponding fluid flows. The fluid flow generated by fluid mover 104 is at least partially a function of the motor speed of motor 102 and the static pressure of conduit 106. In some embodiments, motor 102 is integrated with fluid mover 104.

Controller 108 includes at least one memory device 136 and a processor, such as processor 134, that is communicatively coupled to memory device 136 for executing instructions. In one embodiment, memory device 136 and processor 134 are integrated into a single unit. In some embodiments, executable instructions are stored in memory device 136. In the exemplary embodiment, controller 108 performs one or more operations described herein by programming processor 134. For example, processor 134 may be programmed by encoding an operation as one or more executable instructions and by providing the executable instructions in memory device 136.

In the exemplary embodiment, memory device 136 is one or more devices that enable information such as executable instructions and/or other data to be stored and retrieved. Memory device 136 may include one or more computer readable media, such as, without limitation, dynamic random access memory (DRAM), static random access memory (SRAM), a solid state disk, and/or a hard disk. Memory device 136 may be configured to store, without limitation, application source code, application object code, source code portions of interest, object code portions of interest, configuration data, execution events and/or any other type of data. In the exemplary embodiment, memory device 136 includes firmware and/or initial configuration data for controller 108.

Processor 134 may include one or more processing units (e.g., in a multi-core configuration). Further, processor 134 may be implemented using one or more heterogeneous processor systems in which a main processor is present with secondary processors on a single chip. Alternatively, processor 134 may be a symmetric multi-processor system containing multiple processors of the same type. Further, processor 134 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 134 controls operation of controller 108.

Figure 3:
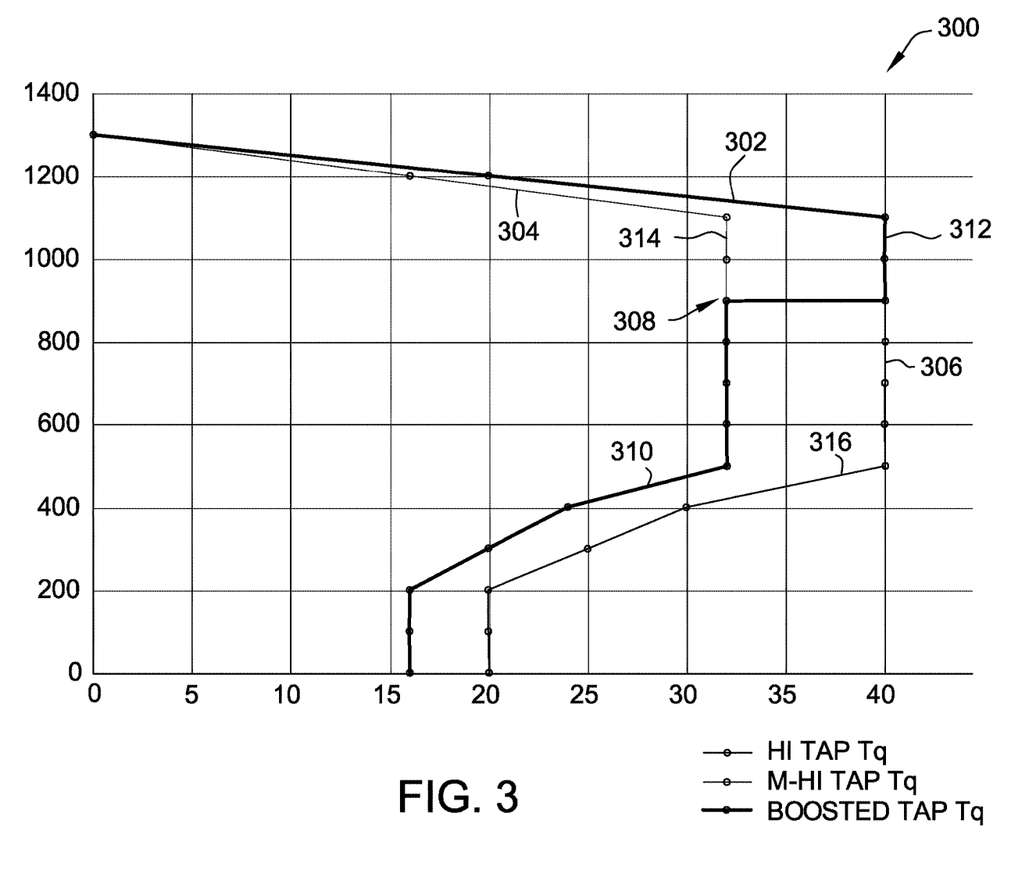
FIG. 3 is a graph of a first speed-torque profile for controlling a constant-torque motor in accordance with one embodiment of the present disclosure.

FIG. 3 is a graph 300 of a first speed-torque profile 302 for controlling a constant-torque motor (e.g., motor 10 shown in FIG. 1 and/or motor 102 shown in FIG. 2) in accordance with one embodiment of the present disclosure. Graph 300 depicts an exemplary programmed relationship between torque in ounce-feet (oz-ft) and rotor speed in revolutions per minute (RPM) for a constant-torque motor for two standard speed-torque profiles 304, 306 and the first "boosted" speed-torque profile 302.

In the illustrated embodiment, the two standard speed-torque profiles 304, 306 are available by respectively energizing two separate input taps (e.g., fourth input tap 126 and fifth input tap 128, both shown in FIG. 2). Moreover, the first standard speed-torque profile 304 corresponds to a medium-high torque output level, and the second standard speed-torque profile 306 corresponds to a high torque output level.

Graph 300 illustrates the advantage of boosted speed-torque profile 302 in providing access to the higher torque output level of the second standard speed-torque profile 306 only above a threshold speed 308. As described herein, a controller (e.g., motor controller 56, shown in FIG. 1, or controller 108, shown in FIG. 2) measures the speed of the rotor. When the measured speed is below threshold speed 308, the controller energizes a stator of the motor to generate a first torque output 310 of the rotor. When the measured speed reaches or exceeds threshold speed 308, the controller energizes the motor stator to generate a second torque output 312 higher than the first torque output 310. In the illustrated embodiment, the first torque output 310 of the boosted speed-torque profile 302 is substantially similar to a torque output 314 of the first standard speed-torque profile 304 at corresponding speeds, and the second torque output 312 of the boosted speed-torque profile 302 is substantially similar to a torque output 316 of the second standard speed-torque profile 304 at corresponding speeds. Accordingly, boosted speed-torque profile 302 may be referred to as a "merged" speed-torque profile. In an alternative embodiment, the first torque output 310 and/or the second torque output 312 may be any torque output (e.g., not corresponding to any standard speed-torque profile(s)).

In one exemplary embodiment, both the boosted speed-torque profile 302 and the first standard speed-torque profile 304 may be accessed by energizing the same input tap (e.g., fourth input tap 126). In such an embodiment, a user (e.g., an installer) may select whether the input tap will provide access to the boosted speed-torque profile 302 or the first standard speed-torque profile 304 during installation, based upon, for example, a static pressure of the system in which the motor is implemented. The user may activate a switch or otherwise manipulate a control that communicates to the controller which of the speed-torque profiles 302, 304 to use in operating the motor.

In the illustrated embodiment, the threshold speed 308 is approximately 900 RPM. The threshold speed 308 may be programmed as any discrete speed, as a stepwise increase. Alternatively, the threshold speed 308 may be programmed as a range of speeds, as a "slope" or programmed rate of increase of torque output over that range of speeds. The slope or rate of increase of torque output may be a constant or may vary (e.g., may be represented as a straight line or as any curve).

Figure 4:
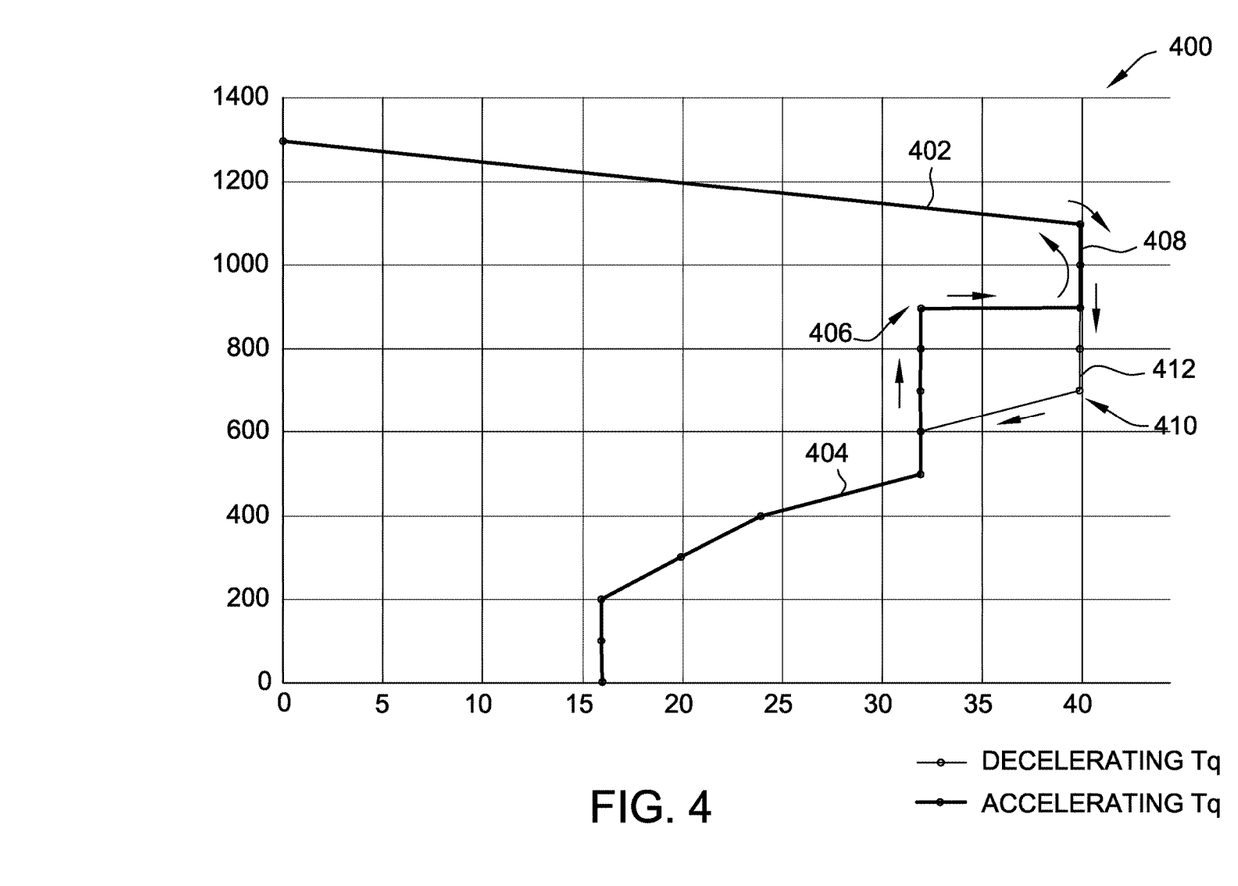
FIG. 4 is graph of a second speed-torque profile for controlling a constant-torque motor in accordance with another embodiment of the present disclosure.

FIG. 4 is graph 400 of a second speed-torque profile 402 for controlling a constant-torque motor (e.g., motor 10 shown in FIG. 1 and/or motor 102 shown in FIG. 2) in accordance with another embodiment of the present disclosure. Graph 400 depicts an exemplary programmed relationship between torque in oz-ft and rotor speed in RPM for a constant-torque motor. The second speed-torque profile 402 is similar in many aspects to first or boosted speed-torque profile 302 (shown in FIG. 3). Specifically, second speed-torque profile 402 includes a first torque output 404 below a first threshold speed 406 and a second torque output 408 above the first threshold speed 406.

However, in the illustrated embodiment, the first torque output 404 and second torque output 408 are generated (e.g., by a controller energizing the motor) during a torque acceleration phase, or as the speed is increasing. In the illustrated embodiment, the second torque output 408 is generated or maintained over a different range of speeds, at or above a second threshold speed 410. Accordingly, during a torque deceleration phase, or as the speed is decreasing, the controller controls the motor to generate the first torque output 404 at or below the second threshold speed 410. Programming different threshold speeds 406, 410 for torque acceleration and deceleration, respectively, reduces or eliminates hunting or oscillation about a threshold. Second threshold speed 410 may be greater than or less than first threshold speed 406, but if second threshold speed 410 is less than first threshold speed 406, it will have the added benefit of reducing or eliminating hunting about a threshold. Moreover, second threshold speed 410 may be programmed as any discrete speed, as a stepwise increase, or, as illustrated, second threshold speed 410 may programmed as a range of speeds, with a slope 412 or programmed rate of decrease of torque output over that range of speeds.

Figure 5:
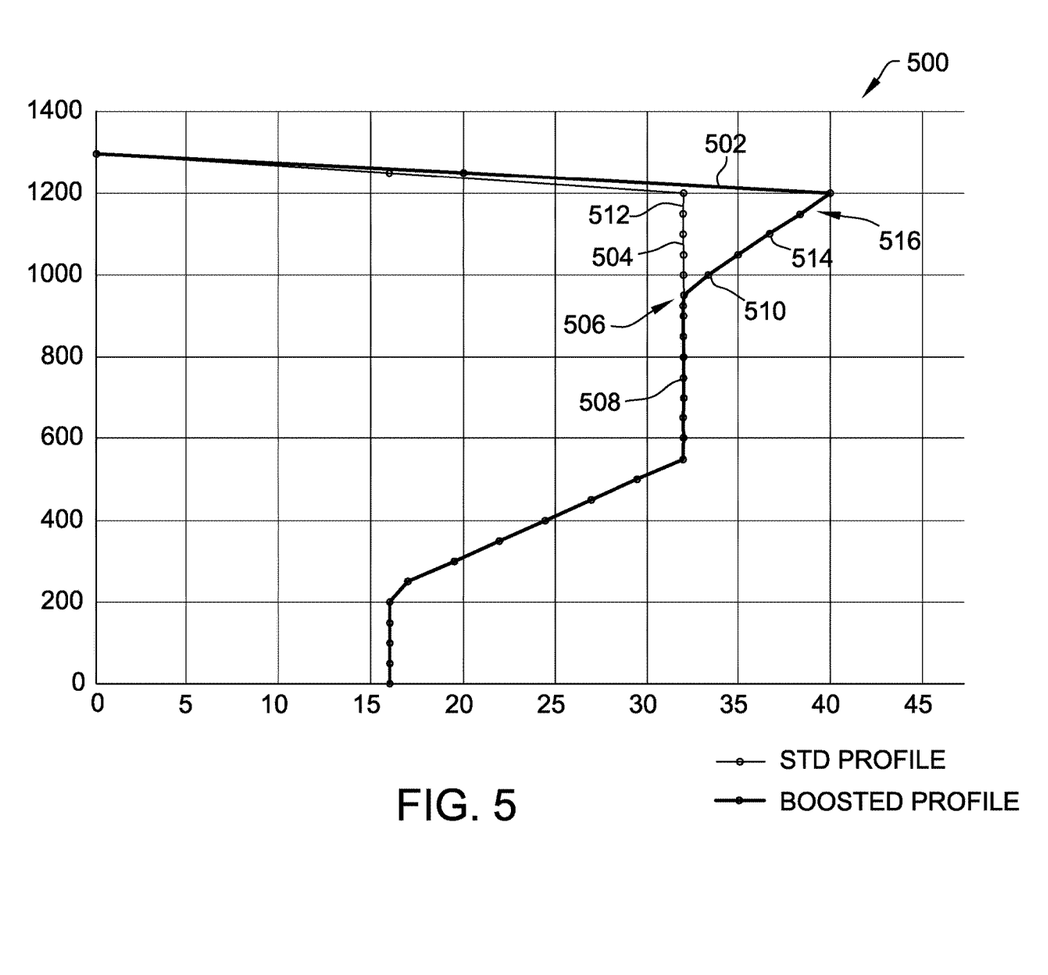
FIG. 5 is a graph of a third speed-torque profile for controlling a constant-torque motor in accordance with another embodiment of the present disclosure.

FIG. 5 is a graph 500 of a third speed-torque profile 502 for controlling a constant-torque motor (e.g., motor 10 shown in FIG. 1 and/or motor 102 shown in FIG. 2) in accordance with another embodiment of the present disclosure. Graph 500 depicts an exemplary programmed relationship between torque in oz-ft and rotor speed in RPM for a constant-torque motor for a standard speed-torque profile 504 and the third, "boosted" speed-torque profile 502.

As described herein, a controller (e.g., motor controller 56, shown in FIG. 1, or controller 108, shown in FIG. 2) measures the speed of the rotor. When the measured speed is below a threshold speed 506, the controller energizes a stator of the motor to generate a first torque output 508 of the rotor. When the measured speed reaches or exceeds threshold speed 506, the controller energizes the motor stator to generate a second torque output 510 higher than the first torque output 508. In the illustrated embodiment, the first torque output 508 of the third, boosted speed-torque profile 502 is substantially similar to a torque output 512 of the standard speed-torque profile 504 at corresponding speeds. In an alternative embodiment, the first torque output 508 and/or the second torque output 510 may be any torque output (e.g., not corresponding to any standard speed-torque profile(s)). Graph 500 depicts the transition from first torque output 508 to second torque output 510 over a range of speeds, as a slope 514 or rate of increase of torque over that range of speeds. More particularly, slope 514 corresponds to a rate of torque increase configured to provide a generally constant fluid flow from a fluid mover (e.g., fluid mover 104, shown in FIG. 2) driven by the motor. In other words, third speed-torque profile 502 includes a constant fluid flow torque boost 516.

In one exemplary embodiment, both the third speed-torque profile 502 and the standard speed-torque profile 504 may be accessed by energizing the same input tap (e.g., fourth input tap 126, shown in FIG. 2). In such an embodiment, a user (e.g., an installer) may select whether the input tap will provide access to the third speed-torque profile 502 or the standard speed-torque profile 504 during installation, based upon, for example, a static pressure of an HVAC system in which the motor is implemented.

Figure 6:
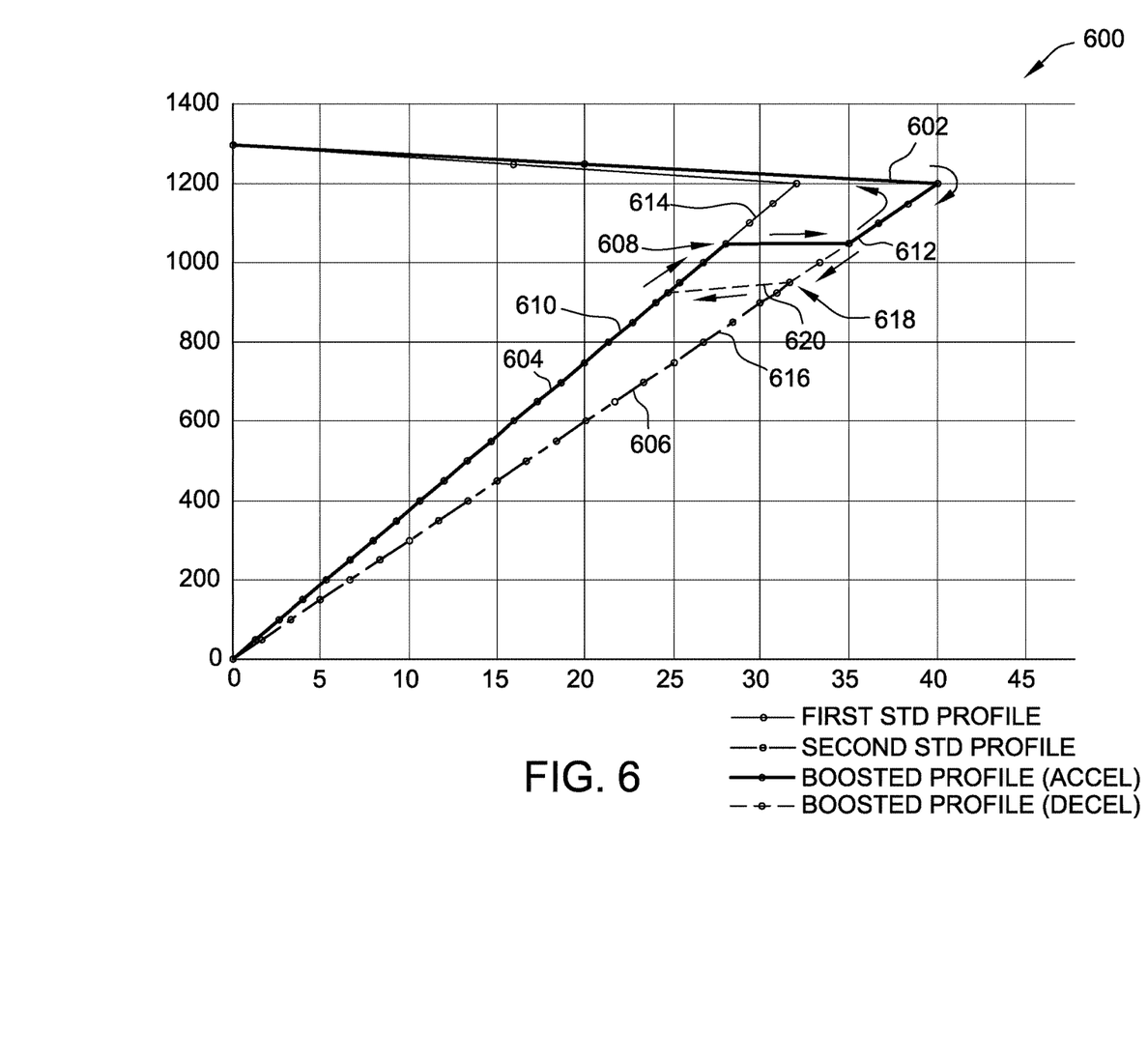
FIG. 6 is a graph of a first speed-torque profile for controlling a constant fluid flow motor in accordance with one embodiment of the present disclosure.

FIG. 6 is a graph 600 of a fourth speed-torque profile 602 for controlling a constant fluid flow motor (e.g., motor 10 shown in FIG. 1 and/or motor 102 shown in FIG. 2) in accordance with one embodiment of the present disclosure. Graph 600 depicts an exemplary programmed relationship between torque in oz-ft and rotor speed in RPM for a constant fluid flow motor for two standard speed-torque profiles 604, 606 and the fourth, "boosted" speed-torque profile 602. Each of these speed-torque profiles 602, 604, 606 is configured to provide a substantially constant fluid flow from a fluid mover (e.g., fluid mover 104, shown in FIG. 2) driven by the motor.

In the illustrated embodiment, the two standard speed-torque profiles 604, 606 are available by respectively energizing two separate input taps (e.g., fourth input tap 126 and fifth input tap 128, both shown in FIG. 2). Moreover, the first standard speed-torque profile 604 corresponds to a medium-high torque output level, and the second standard speed-torque profile 606 corresponds to a high torque output level.

As described herein, a controller (e.g., motor controller 56, shown in FIG. 1, or controller 108, shown in FIG. 2) measures the speed of the rotor. When the measured speed is below a first threshold speed 608, the controller energizes a stator of the motor to generate a first torque output 610 of the rotor. When the measured speed reaches or exceeds first threshold speed 608, the controller energizes the motor stator to generate a second torque output 612 higher than the first torque output 610. In the illustrated embodiment, the first torque output 610 of the boosted speed-torque profile 602 is substantially similar to a torque output 614 of the first standard speed-torque profile 604 at corresponding speeds, and the second torque output 612 of the boosted speed-torque profile 602 is substantially similar to a torque output 616 of the second standard speed-torque profile 604 at corresponding speeds. In an alternative embodiment, the first torque output 610 and/or the second torque output 612 may be any torque output (e.g., not corresponding to any standard speed-torque profile(s)).

However, in the illustrated embodiment, the first torque output 610 and second torque output 612 are generated (e.g., by a controller energizing the motor) during a torque acceleration phase, or as the speed is increasing. In the illustrated embodiment, the second torque output 612 is generated, activated, or maintained over a range of speeds, at or above first threshold speed 608, during the torque acceleration phase. During a torque deceleration phase, or as the speed is decreasing, the second torque output 612 is generated, activated, or maintained over a different range of speeds, at or above a second threshold speed 618. The controller controls the motor to resume the first torque output 610 at or below the second threshold speed 618.

In the illustrated embodiment, first threshold speed 608 is approximately 1050 RPM. Second threshold speed 618 may be greater than or less than first threshold speed 608, but if second threshold speed 618 is less than first threshold speed 608, it will have the added benefit of reducing or eliminating oscillation or hunting about a threshold. As illustrated, second threshold speed is 618 is programmed as a range of speeds, with a slope 620 or programmed rate of decrease of torque output over that range of speeds (e.g., from about 950 RPM to about 925 RPM).

In one exemplary embodiment, both the boosted speed-torque profile 602 and the first standard speed-torque profile 604 may be accessed by energizing the same input tap (e.g., fourth input tap 126). In such an embodiment, a user (e.g., an installer) may select whether the input tap will provide access to the boosted speed-torque profile 602 or the first standard speed-torque profile 604 during installation, based upon, for example, a static pressure of an HVAC system in which the motor is implemented.

Figure 7:
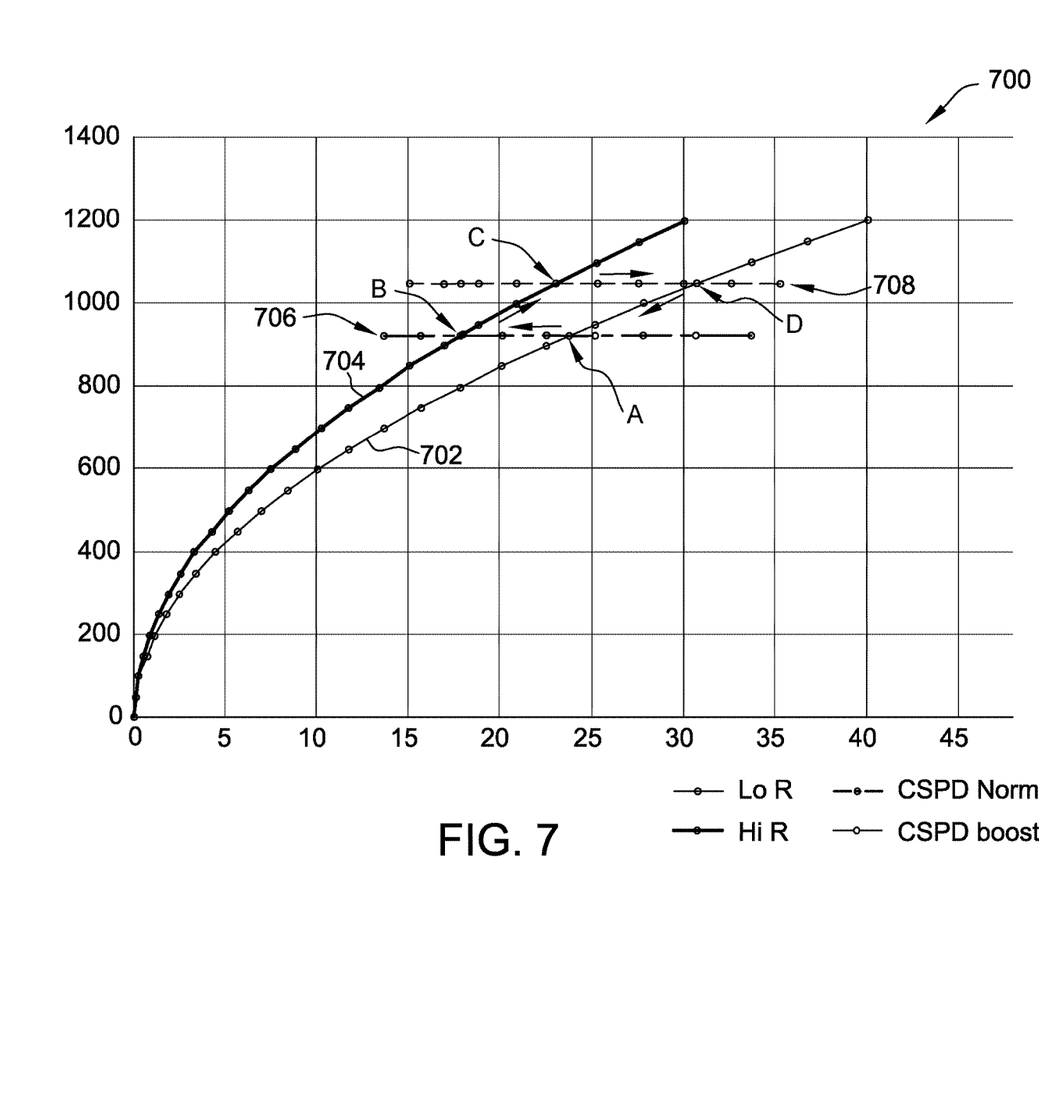
FIG. 7 is a graph of fan load curves mapping control of a constant-speed motor in accordance with one embodiment of the present disclosure.

FIG. 7 is a graph 700 of fan load curves mapping control of a constant-speed motor (e.g., motor 10 shown in FIG. 1 and/or motor 102 shown in FIG. 2) in accordance with one embodiment of the present disclosure. In particular, graph 700 represents fan load curves of a forward-leaning or centrifugal fan or blower. Graph 700 depicts an exemplary programmed relationship between fluid flow (in arbitrary units) and fluid flow restriction or static pressure (in arbitrary units) for a constant-speed motor. In the illustrated embodiment, graph 700 includes a first fan load curve 702 and a second fan load curve 704. Generally, first fan load curve 702 corresponds to operation of a motor under low fluid flow restriction conditions. Where the motor is implemented in an air-moving system, such as an HVAC system, the low fluid flow restriction conditions may correspond to having all vents or dampers open. Second fan load curve 704 corresponds to operation of the motor under higher fluid flow restriction conditions. Where the motor is implemented in an HVAC system, the higher fluid flow restriction condition may correspond to having a plurality of dampers closed.

A controller (e.g., motor controller 56, shown in FIG. 1, or controller 108, shown in FIG. 2) measures at least one operating parameter of the motor, such as a speed, a power, and/or a torque of the motor, and increases at least one operating parameter of the motor until the motor is operating under a first constant speed 706. For example, under the low fluid flow restriction condition, the motor operates at point A, the intersection between first fan load curve 702 and first constant speed 706. When the fluid flow restriction increases, the controller controls the motor to transition to the second fan load curve 704, to point B, where second fan load curve 704 intersects with first constant speed 706. Specifically, in the illustrated embodiment, the controller decreases the torque. In the illustrated embodiment, the controller determines that the torque has decreased such that the motor is operating at point B. The controller then boosts the motor's speed to a second constant speed 708. In other words, the controller controls the motor to operate at point C, the intersection of second fan load curve 704 and second constant speed 708. When the fluid flow restriction decreases, the controller controls the motor to transition back to the first fan load curve 702, to point D, where first fan load curve 702 intersects with second constant speed 708.

In one exemplary embodiment, both the first fan load curve 702 and the second fan load curve 704 may be accessed by energizing the same input tap (e.g., fourth input tap 126). In such an embodiment, a user (e.g., an installer) may select whether the input tap will provide access to the boosted speed 708 during installation, based upon, for example, a static pressure of an HVAC system in which the motor is implemented (e.g., whether fluid flow restrictions are above a threshold level). Alternatively, the motor may dynamically measure at least one operating parameter of the motor (e.g., a speed of the motor, a torque output of the motor, a power of the motor, etc.) and access boosted speed 708 (e.g., increase at least one operating parameter of the motor) based upon the measured at least one operating parameter.

Figure 8:
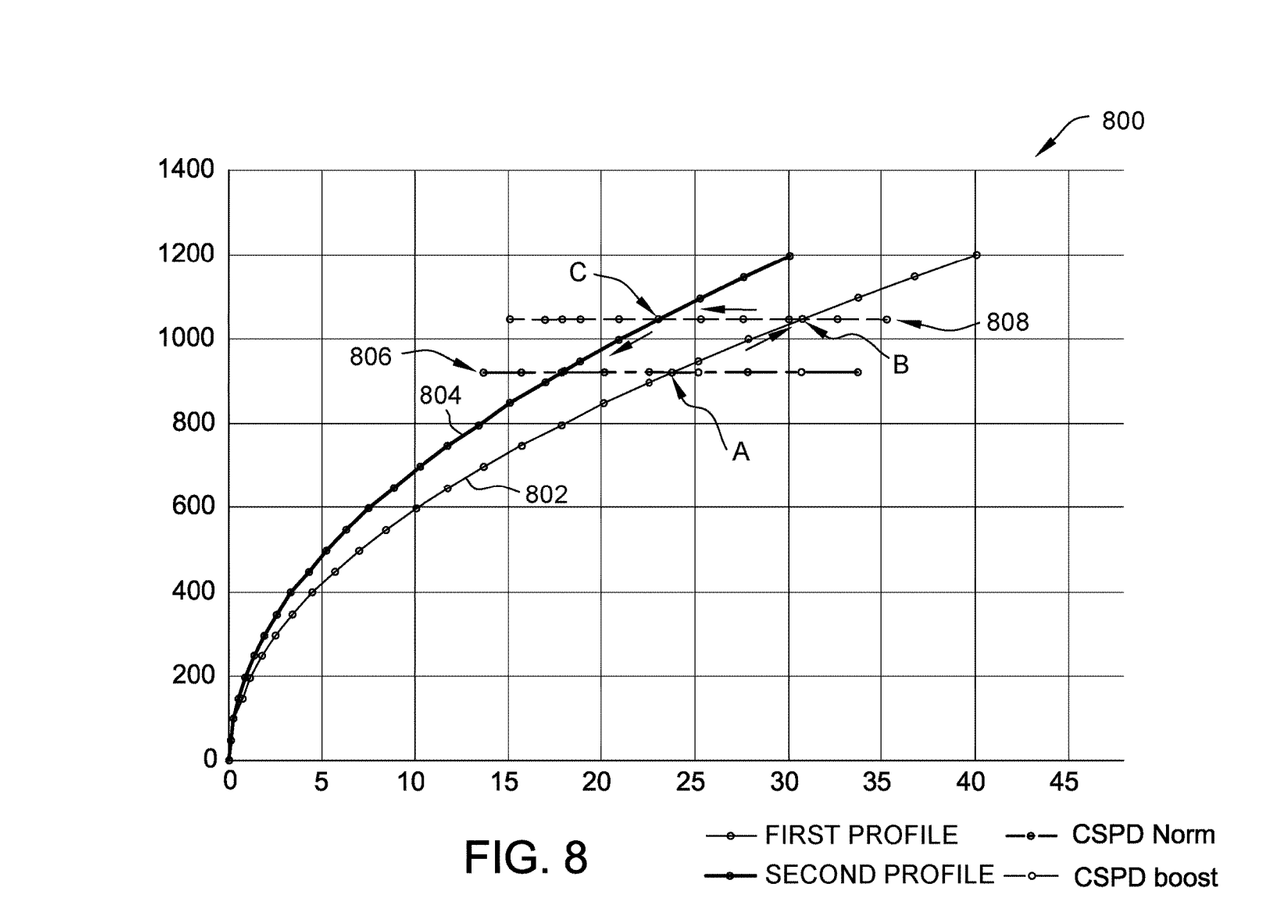
FIG. 8 is a graph of a fan load curves mapping control of a constant-speed motor in accordance with another embodiment of the present disclosure.

FIG. 8 is a graph 800 of fan load curves mapping control of a constant-speed motor (e.g., motor 102 shown in FIG. 2) in accordance with one embodiment of the present disclosure. In particular, graph 800 represents fan load curves of a propeller fan. Graph 800 depicts an exemplary programmed relationship between fluid flow (in arbitrary units) and fluid flow restriction or static pressure (in arbitrary units) for a constant-speed motor. In the illustrated embodiment, graph 800 includes a first fan load curve 802 and a second fan load curve 804.

During an acceleration or start-up phase, a controller (e.g., motor controller 56, shown in FIG. 1, or controller 108, shown in FIG. 2) measures at least one operating parameter of the motor, such as a speed, a power, and/or a torque of the motor, and increases at least one operating parameter of the motor until the motor is operating under a first constant speed 806. If the controller determines that an operating parameter exceeds a threshold at the first constant speed 812 (e.g., a torque threshold or a power threshold), the controller is configured to boost the constant speed at which the motor operates from the first constant speed 806 to a second, higher constant speed 808. In the illustrated embodiment, the torque output of the motor exceeds a torque threshold when the first constant speed 806 is achieved by the motor (point A). Accordingly, the controller boosts the speed to the second constant speed 808 (point B).

During a deceleration phase, the controller controls the motor to transition, at the second constant speed 808, to a decreased torque output (e.g., a torque output below the threshold that triggered the speed boost), illustrated as point C, the intersection between the second constant speed 808 and the second fan load curve 804. The controller then decreases the speed and/or torque output of the motor according to the second fan load curve 804, to avoid oscillation of the motor about point A during the deceleration phase.

In one exemplary embodiment, both the first fan load curve 802 and the second fan load curve 804 may be accessed by energizing the same input tap (e.g., fourth input tap 126). In such an embodiment, a user (e.g., an installer) may select whether the input tap will provide access to the boosted speed 808 during installation, based upon, for example, a static pressure of an HVAC system in which the motor is implemented (e.g., whether fluid flow restrictions are above a threshold level). Alternatively, the motor may dynamically measure at least one operating parameter of the motor (e.g., a speed of the motor, a torque output of the motor, a power of the motor, etc.) and access boosted speed 808 (e.g., increase at least one operating parameter of the motor) based upon the measured at least one operating parameter.

Figure 9:
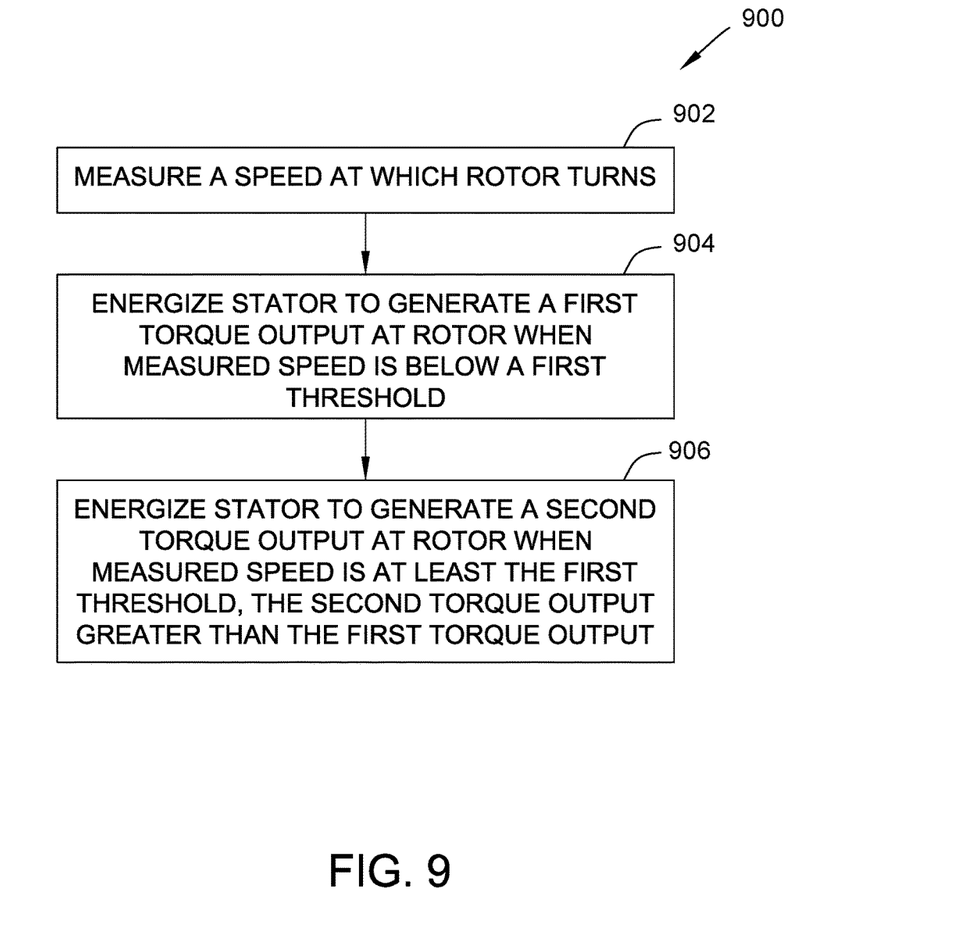
FIG. 9 is a flow diagram of an exemplary method of controlling a motor embodied in the motor system shown in FIG. 2.

FIG. 9 is a flow diagram of an exemplary method 800 of increasing a torque output of a motor (e.g., motor 10 shown in FIG. 1 and/or motor 102 shown in FIG. 2). Method 900 is at least partially performed by a controller (e.g., motor controller 56 shown in FIG. 1 and/or controller 108 shown in FIG. 2). In other embodiments, method 900 may include additional, fewer, or alternative steps, including those described elsewhere herein.

In one exemplary embodiment, the motor includes a stator (e.g., stator 14, shown in FIG. 1) including windings (e.g., windings 44, shown in FIG. 1) configured to be energized, and a rotor (e.g., rotor 18, shown in FIG. 1) electromagnetically coupled to the stator and configured to turn relative thereto when the stator is energized. The controller measures 902 a speed of the motor (e.g., a speed at which the rotor turns), and energizes 904 the motor to generate a first torque output when the measured speed is below a first threshold. The controller also energizes 906 the motor to generate a second torque output when the measured speed is at least the first threshold, wherein the second torque output is greater than the first torque output.

In some embodiments, the controller energizes 906 the motor to generate the second torque output when the measured speed reaches a discrete, pre-programmed threshold speed. In other embodiments, the controller energizes 906 the motor to generate the second torque output by increasing a torque output from the first torque output to the second torque output at a first rate, when the measured speed reaches a first speed within a speed range.

In addition, in some embodiments, the controller energizes 904 the motor to generate the first torque output and energizes 906 the motor to generate the second torque output during a torque acceleration phase. The controller further energizes the motor to resume the first torque output when the measured speed descends below a second threshold during a torque deceleration phase. The second threshold is less than the first threshold. In certain embodiments, the controller energizes the motor to generate the first torque output by decreasing a torque output from the second torque output to the first torque output at a second rate, which may be the same as or different from the first rate.

The methods and systems described herein may be implemented using computer programming or engineering techniques including computer software, firmware, hardware or any combination or subset thereof, wherein the technical effect may include at least one of: (a) providing higher torque outputs at higher static pressure without accessing a higher-torque input tap; (b) improving overall motor efficiency while still enabling access to the higher torque outputs; and (c) facilitating access to more than one speed-torque profile using a single input tap.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device", "computing device", and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motor comprising:
 a stator comprising windings configured to be energized;
 a rotor electromagnetically coupled to said stator and configured to turn relative thereto when said stator is energized; and a motor controller configured to:
  measure a speed at which said rotor turns,
  energize said stator to generate a first torque output at said rotor when the measured speed is below a first threshold,
  when a boosted torque mode is activated for said motor, energize said stator to generate a second torque output at said rotor when the measured speed is at least the first threshold, wherein the second torque output is greater than the first torque output, and
  when the boosted torque mode is not activated for said motor, energize said stator to generate the first torque output at said rotor when the measured speed is at least the first threshold.

2. The motor of claim 1, wherein said motor controller is further configured to energize said stator to generate the second torque output at said rotor by increasing a torque output at said rotor from the first torque output to the second torque output at a first rate.

3. The motor of claim 1, wherein said motor controller is further configured to energize said stator to generate the first torque output at said rotor and the second torque output at said rotor during a torque acceleration phase.

4. The motor of claim 3, wherein said motor controller is further configured to energize said stator to resume the first torque output when the measured speed descends below a second threshold during a torque deceleration phase.

5. The motor of claim 4, wherein the second threshold is less than the first threshold.

6. The motor of claim 4, wherein said motor controller is further configured to energize said stator to resume the first torque output by decreasing a torque output from the second torque output to the first torque output at a second rate.

7. The motor of claim 1, wherein said motor controller is further configured to:
  compute a power output of said rotor;
  compare the computed power to a power threshold; and
  energize said stator to generate the second torque output at said rotor when the computed power is at least the power threshold.

8. A fluid moving system, comprising:
  a fluid mover configured to generate a fluid flow;
  a motor coupled to said fluid mover and configured to drive said fluid mover, said motor comprising:
    a stator comprising windings configured to be energized; and
    a rotor electromagnetically coupled to said stator and configured to turn relative thereto when said stator is energized; and
  a controller configured to:
    measure a speed at which said rotor turns,
    energize said stator to generate a first torque output at said rotor when the measured speed is below a first threshold, and
    energize said stator to generate a second torque output at said rotor when the measured speed is at least the first threshold, wherein the second torque output is greater than the first torque output.

9. The fluid moving system of claim 8, wherein said controller is further configured to energize said stator to generate the second torque output at said rotor by increasing a torque output at said rotor from the first torque output to the second torque output at a first rate.

10. The fluid moving system of claim 9, wherein said motor is further configured to drive said fluid mover to output a constant fluid flow, and wherein the first rate maintains the constant fluid flow.

11. The fluid moving system of claim 8, wherein said controller is further configured to:
  energize said stator to generate the first torque output at said rotor and the second torque output at said rotor during a torque acceleration phase; and
  energize said stator to resume the first torque output when the measured speed descends below a second threshold during a torque deceleration phase.

12. The fluid moving system of claim 11, wherein the second threshold is less than the first threshold.

13. The fluid moving system of claim 11, wherein said controller is further configured to energize said stator to resume the first torque output by decreasing a torque output from the second torque output to the first torque output at a second rate.

14. The fluid moving system of claim 13, wherein said motor is further configured to drive said fluid mover to output a constant fluid flow, and wherein the second rate maintains the constant fluid flow.

15. A method for increasing a torque output of a motor, said method comprising:
  measuring a speed of the motor;
  energizing the motor to generate a first torque output when the measured speed is below a first threshold;
  when a boosted torque mode is activated for the motor, energizing the motor to generate a second torque output when the measured speed is at least the first threshold, wherein the second torque output is greater than the first torque output; and
  when the boosted torque mode is not activated for the motor, energizing the motor to generate the first torque output when the measured speed is at least the first threshold.

16. The method of claim 15, wherein energizing the motor to generate a second torque output comprises energizing the motor to generate the second torque by increasing the torque output from the first torque output to the second torque output at a first rate.

17. The method of claim 15 further comprising energizing the motor to generate the first torque output and energizing the motor to generate the second torque output during a torque acceleration phase.

18. The method of claim 17 further comprising, during a torque deceleration phase, energizing the motor to generate the first torque output when the measured speed is at a second threshold.

19. The method of claim 18 further comprising energizing the motor to generate the first torque output by decreasing the torque output from the second torque output to the first torque output at a second rate.

20. The method of claim 19, wherein the motor is configured to drive a fluid mover to output a constant fluid flow, and wherein decreasing a torque output from the second torque output to the first torque output at a second rate comprises maintaining the constant fluid flow output from the fluid mover.

* * * * *